Dec. 15, 1936.      C. F. BRUCE      2,063,980
DIE HOLDER
Filed Sept. 9, 1935
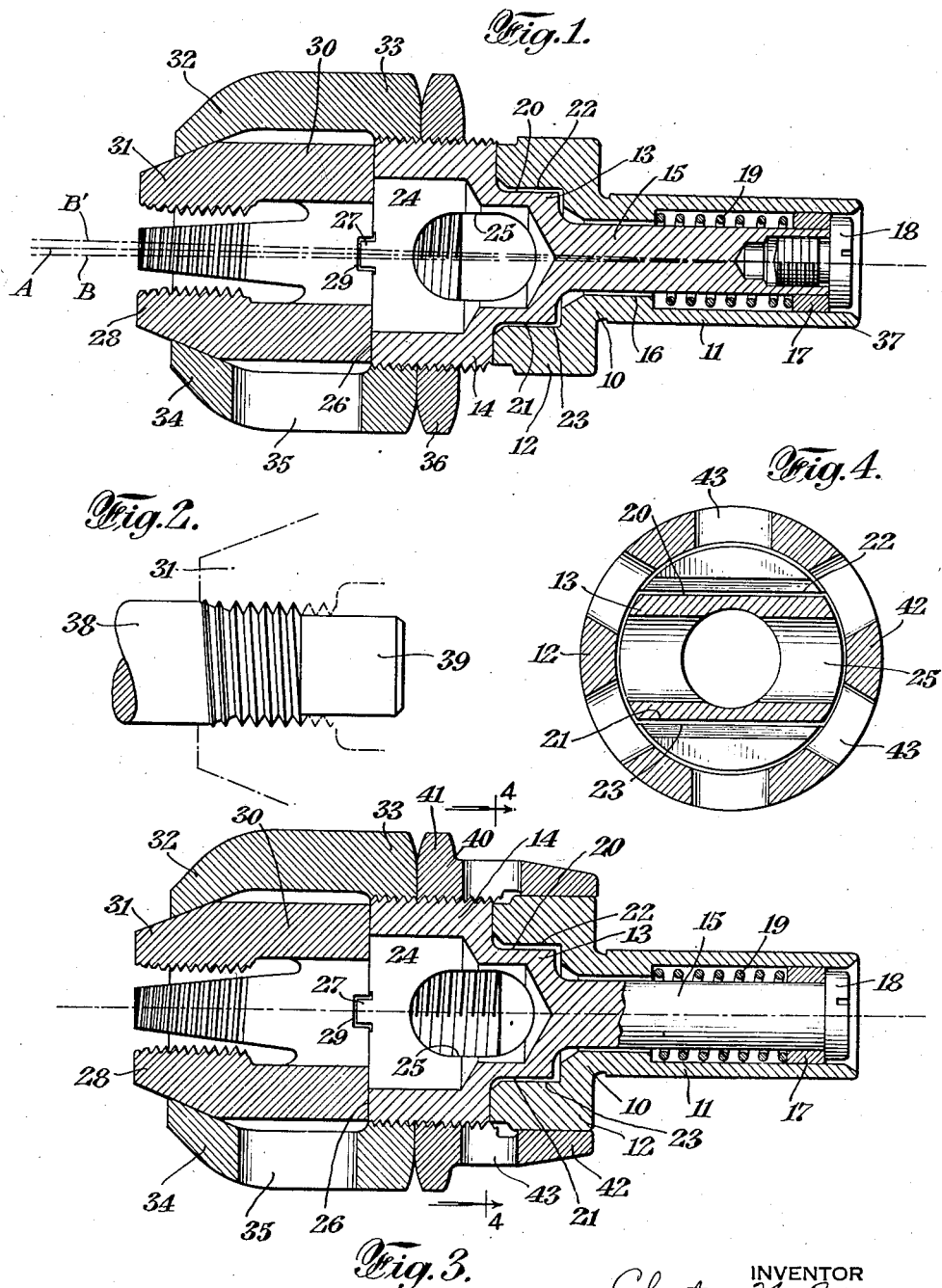
INVENTOR
Chester F. Bruce
BY
Edwards, Bower and Pool
ATTORNEY Patented Dec. 15, 1936

2,063,980

UNITED STATES PATENT OFFICE 2,063,980

DIE HOLDER

Chester F. Bruce, Greenfield, Mass., assignor to Greenfield Tap and Die Corporation, Greenfield, Mass., a corporation of Massachusetts Application September 9, 1935, Serial No. 39,719

8 Claims. (Cl. 10—89)

This invention relates to holders for dies adapted to cut threads on such articles as screws and rods and the like, and has for its object to obtain greater precision in the use of such dies.

The particular type of die holder apparatus to which this invention pertains is that in which a die is held by a body having a shaft supported within a driving shank to which the driving force is applied. The driving force is transmitted to the body by driving surfaces of the shank which mate with corresponding surfaces of the body. Owing to distortion occasioned by heat treatment and desirable manufacturing tolerances, considerable play has heretofore been allowed to exist between the body and the shank to enable the mating surfaces to register properly and to permit alignment of the die holder parts on the work.

This play existing, as it does, between the driving shank and the shaft of the die holding body has allowed the die to sag somewhat below the driving axis so that the die was not initially centered on the work. In the case of most ordinary work this sagging is usually of no serious consequence, because upon starting, the die quickly centers itself, especially when provided with the usual chamfer. In the case of some special work, however, as where a thread is to be cut behind a protuberance having a diameter very nearly as great as the minor diameter of the thread, any substantial sagging would cause the protuberance to be scratched or scored when the die passes over it.

According to this invention there is provided for the above type of die holders a device which accurately centers the die on the work. More specifically, this centering device is a rigid guide which engages a member of the body and a member of the shank in a manner to align the body with a shank. Preferably the guide is a nut which is threaded on one of the members and has an extension which closely, but slidably, engages the other member. In a preferred embodiment the guide is a lock nut which threads on the body and locks the die cap, and the extension is a hollow cylinder which receives a cylindrical member of the shank.

A feature of this invention resides in the convertibility provided thereby. It is possible, simply by removing the guide or replacing it by an ordinary lock-nut, to cause the holder to revert to the ordinary sagging type. The play which exists in the ordinary sagging holder is frequently desirable, to compensate for misalignments in the work.

The invention will be better understood from the following detailed description of a preferred embodiment, when considered with the accompanying drawing, of which Fig. 1 is a sectional view of a die and a holder constructed according to the prior art;

Fig. 2 illustrates a precision type of work which the prior known apparatus of Fig. 1 is not well adapted to perform;

Fig. 3 is a sectional view of a die and holder constructed according to this invention, adapted to perform the work shown in Fig. 2; and Fig. 4 is a section taken at line 4—4 of Fig. 3.

The device of the prior art shown in Fig. 1 comprises a hollow shank 10 having a relatively long cylindrical portion 11 terminating in a head portion 12 of larger diameter. A body portion 13 has a cylindrical head 14 and a stem 15 which is held within the cylindrical portion 11 of the shank. The stem 15 is supported by a restricted portion 16 of the shank and by a collar 17 forced over the end of the stem and held by a screw 18. A spring 19, held in compression between the collar 17 and the restricted portion 16 tends to retain the stem within the shank. The body portion is provided with a pair of parallel flat surfaces 20 and 21 milled, prior to heat treatment, at the region between the head 14 and the stem 15. These flat surfaces 20 and 21 engage within a pair of corresponding parallel flat driving surfaces 22 and 23 milled within the head end of the shank to form a slot.

The head 14 of the body is centrally hollowed out at 24, and openings 25 extend through the side of the head to the central opening 24 to permit cuttings to fall away from the holder unit. The end of the head at 26 forming a ring around the hollow 24 is ground to a finish and provided with lugs 27.

A die 28 abuts the end 26, and notches 29 in the base 30 thereof receive the lugs 27. Several lands 31, having the cutting threads formed on their inner surfaces, extend forward from the base.

A cap 32, having a threaded base 33 and an annular portion 34 held forward by forwardly extending supports between which are open spaces 35 to permit cuttings to pass, is threaded over the end of head 14. The annular portion 34 engages the outer surfaces of the lands so that the depth of the cut may be increased when desired by screwing the cap further on the head to compress the lands. A lock-nut 36 serves to lock the cap in position.

In operating the unit a driving torque is applied at the outer cylindrical surface of member 11 of the driving shank 10 by any suitable device such as an automatic screw machine. The flat slot faces 22 and 23 engage the flats 20 and 21, thereby transmitting the driving torque to the body and the die. The body is free to "float" outwardly, that is, the shaft 15 may withdraw somewhat from the shank against the compression of the spring, so that the die is free to follow its own lead on the work regardless of whatever lag exists in the machine.

In this assembly the head end of the body is carried loosely within the head end of the shank because of the relatively large play at the flats and at the restricted portion 16 of the shank. There is a closer sliding fit at the collar 17, so the collar acts as a fulcrum from which there occurs a sag equal to the difference between the true center line "A" of the shank and the axis of stem 15. The line "B" indicates the position of the axis of stem 15 when it has sagged. The body and stem are shown in Fig. 1 at the true center line, but it should be understood that when the die is not engaged with its work sagging occurs. The play of the stem which permits the sagging exists in all directions; line B' indicates the play in the upward direction.

It is not practical to construct the die holder as thus assembled with such small tolerances as to prevent the sagging, largely because of the distortion which commonly occurs during heat treatment of the individual units. The heat treatment, in the case of the shank, tends to distort the alignment of the head end 12 so that the flat slot surfaces 22 and 23 become misaligned and off center with reference to the axis of the shank. Similarly, in the case of the body, the heat treatment tends to warp the head 14 with reference to the stem 15 so that the flats 20 and 21 become misaligned and off center with respect to the axis of the stem.

Consequently, if it were attempted to eliminate the sag by reducing the tolerances at the restricted portion 16 and collar 17, a good driving engagement would not be likely to exist at the flats. In spite of the large tolerances provided at the flats the driving engagement would usually be imperfect because only one pair of the mating surfaces would be likely to make contact, owing to the misalignment. A good driving contact at both pairs of mating flat surfaces could be insured only by an expensive grinding operation on the flats subsequent to the heat treatment.

For the above reasons and for reasons of manufacturing expediency it has not been found practical to remove the sag or play by removing the play from between the stem and shank; so considerable tolerance is provided at the stem and at the flats. By reason of these tolerances the die is enabled to center itself on the work even though the heads of the body and shank, including the flats, be somewhat misaligned.

It is noted that the cutting threads are located a considerable distance in front of the nearest bearing at region 16 of the shank; hence, the alignment control of the die is considerably impaired. Furthermore, as the thread cutting proceeds the body shaft is withdrawn somewhat from the shank and the end bearing, or fulcrum, at collar 17 gradually approaches the bearing at region 16, thus magnifying the substantial initial misalignment. For the above reasons, the prior known type of holder shown in Fig. 1 must be permitted to sag, which sagging is usually not serious in the case of ordinary work.

Occasionally, however, thread cutting must be done beyond a projection having a diameter only slightly less than the minor diameter of the screw thread. In such a case, a die, located in a sagging die holder of the type shown in Fig. 1, would scratch or score the projection in passing over it. In such cases the alignment and float must be maintained accurate within very close limits. Fig. 2, which is an example of such a case, illustrates a shaft 38 having a projecting end portion 39 of somewhat smaller diameter. The problem is to thread the wider diameter of shaft 38 without scratching the projecting portion 39. The dotted lines indicate the necessary position of one of the lands 31 of the die in cutting the threads. Obviously, if there is any appreciable sagging of the die holder the protruding portion 39 will be scored.

The more accurate alignment required for this purpose is provided in accordance with this invention by a die holder of a type like that illustrated in Fig. 3. The assembly of Fig. 3 is nearly the same as that of Fig. 1; and the same numerals in the two figures indicate identical parts. The difference between Figs. 1 and 3 resides in the use, in the unit of Fig. 3, of a combined locknut and extension guide 40, instead of the locknut 36 of Fig. 1. The device 40 comprises a nut portion 41 and a guide portion 42 having an inner cylindrical surface, and extending back from the nut. Holes 43 through the sides of the device 40 register with the side openings 25 of the body head and permit the escape of cuttings.

The inner cylindrical wall of the extension guide is ground with reference to the threads on the nut portion 41; that is, the longitudinal axes of the threaded part and of the cylindrical extension wall are the same. The outer surface of the cylindrical portion 11 of the shank is ground with reference to the outer cylindrical surface of the head end 12; that is, the axes of these two surfaces are the same. The outer cylindrical surface of the head end 12 may also be ground, if desired, to provide a nice sliding fit within the extension guide. These grinding operations are performed after the heat treatment, and very little tolerance is allowed between the engaging surfaces of parts 42 and 12. Hence, since surface 26 of the head is faced with reference to the threads on the head, the holder unit is accurately aligned from the die to the outer cylindrical surface of part 11 of the shank.

This new extension guide lock-nut carries the weight of the die and its carrying parts. It constitutes a bearing around the head of the shank which is closer to the die than the region 16 so that the magnification of the sag is reduced. The use of this aligning device allows work to be threaded closely to a size, concentric and straight. Furthermore, by reason of its use, breakage of dies and spoiled work are reduced.

An important advantage in creating the alignment between the body and the shank by means of an outer guide such as 40 resides in the convertibility of the holder unit. It is frequently advantageous to allow some play between the body and to compensate for misalignment of the work. Since such play is present in the holder of Fig. 1 but not in the holder of Fig. 3, it is of considerable advantage to be able to convert a holder according to Fig. 1 into a holder according to Fig. 3. This conversion is possible by the selection of a simple lock-nut such as 36, on the one hand, or an extension guide nut such as 40, on the other hand. If the rigid alignment of the unit in Fig. 3 were created by a permanent close fitting of a part within the shank (instead of by a removable part without the shank) the conversion could not be made.

I claim:—

1. A die holder comprising a hollow driving shank having an enlarged end provided with an outer cylindrical surface, a die holding body having a die holding head and a stem which fits loosely within said shank, whereby said body tends to sag below the longitudinal axis of said shank, means for transmitting driving torque from said shank to said body, and a guide nut threaded over said head, said guide nut having an extension guide provided with an inner cylindrical surface which fits closely, but slidably, over said cylindrical surface of the enlarged end of said shank, thereby preventing said sag of said body.

2. A die holder comprising a hollow driving shank having an enlarged end provided with an outer cylindrical surface, a die holding body having a die holding head provided with an outer cylindrical surface and a stem which fits loosely within said shank, whereby the longitudinal axis of said body tends to depart from the longitudinal axis of said shank, means for transmitting driving torque from said shank to said body, and a guide nut threaded on one of said outer cylindrical surfaces, said guide nut having an extension guide provided with an inner cylindrical surface which fits closely, but slidably, over the other of said outer cylindrical surfaces, thereby preventing said departure of the axis of said body.

3. A die holder comprising a hollow driving shank having an enlarged end provided with an outer cylindrical surface, a die holding body having a die holding head provided with an outer cylindrical surface and a stem which fits loosely within said shank, whereby said body tends to sag in said shank, means for causing said stem to move longitudinally in the direction of withdrawal from said shank during the thread cutting operation, means for transmitting driving torque from said shank to said body, and a guide nut threaded on one of said outer cylindrical surfaces, said guide nut having an extension guide provided with an inner cylindrical surface which fits closely, but slidably, over the other of said outer cylindrical surfaces, thereby preventing the sag of said body while permitting the longitudinal movement of said stem in said shank.

4. A die holder comprising a hollow driving shank having an enlarged end provided with an outer cylindrical surface, a die holding body having a die holding head provided with an outer cylindrical surface and a stem which fits loosely within said shank, a die holding cap threaded on said cylindrical surface of said head, means for causing said stem to move longitudinally in the direction of withdrawal from said shank during the thread cutting operation, means for transmitting driving torque from said shank to said body, and a nut threaded in back of said cap on said outer cylindrical surface of said head, said nut having a rearwardly extending guide provided with an inner cylindrical surface which fits closely, but slidably, over the outer cylindrical surface of said enlarged end, said nut acting as a lock nut for said cap and as a guide which prevents sag of said body.

5. A die holder comprising a shank having a head provided with an outer periphery and a relatively long cylindrical portion having its axis aligned with the axis of said periphery, a die holding body having a head provided with a threaded outer periphery and a stem which fits loosely within said shank, means for transmitting driving torque from said shank to said body, and means for aligning the axes of said body head and of said cylindrical portion, said latter means comprising a guide nut having an extension guide provided with an inner peripheral surface whose axis is aligned with the axis of the threads of said nut, said nut being threaded on said threaded outer periphery and said extension guide fitting closely, but slidably, over said periphery of said shank head.

6. A die holder comprising a shank having an outer periphery, a die holding body having an outer periphery and a stem which fits loosely within said shank, means for transmitting driving torque from said shank to said body, and removable means for rigidly aligning said shank and body, said removable means comprising a nut having an extension guide provided with an inner cylindrical surface which is aligned with the threads on said nut, said nut being adapted to be threaded on one of said outer peripheries, and said guide fitting closely, but slidably, over the other of said outer peripheries.

7. A die holder comprising a hollow driving shank having an outer cylindrical area coaxially aligned with a driving portion thereof, a body comprising a die supporting head having a cylindrical area which is located closely adjacent to, and of substantially the same diameter as, the first mentioned cylindrical area and a stem protruding from said body which fits loosely within said shank, means for transmitting driving torque from said shank to said body, and a guide having inner aligned cylindrical surfaces one of which fits closely over one of said cylindrical areas and another of which fits closely but slidably over the other cylindrical area closely to hold the alignment between said head and driving portion, and yet permit at least some rotary movement between said body and shank.

8. A die holder comprising a hollow shank having a head provided with an outer periphery and a relatively long cylindrical portion having its axis aligned with the axis of said periphery, a die holder body having a head provided with an outer periphery and a stem which fits loosely within said shank, means for transmitting driving torque from said shank to said body, and a guide having inner aligned surfaces one of which fits closely over one of said peripheries and the other of which fits closely but slidably over the other of said peripheries to align the axes of said body head and said cylindrical portion and yet permit at least some rotary movement between said body and shank.

CHESTER F. BRUCE.